United States Patent
Shahi et al.

(10) Patent No.: US 9,922,199 B2
(45) Date of Patent: Mar. 20, 2018

(54) DOCUMENT SECURITY TOOL

(71) Applicant: BANK OF AMERICA CORPORATION, Charlotte, NC (US)

(72) Inventors: Ankit Shahi, Hyderabad (IN); Shambhu Narayan, Gurgaon (IN); Khushrav Farokh Patel, Mumbai (IN)

(73) Assignee: Bank of America Corporation, Charlotte, NC (US)

( * ) Notice: Subject to any disclaimer, the term of this patent is extended or adjusted under 35 U.S.C. 154(b) by 132 days.

(21) Appl. No.: 15/047,111

(22) Filed: Feb. 18, 2016

(65) Prior Publication Data

US 2017/0243015 A1 Aug. 24, 2017

(51) Int. Cl.
*H04L 29/06* (2006.01)
*G06F 21/62* (2013.01)
*G06F 21/31* (2013.01)
*G06F 21/60* (2013.01)
*H04L 9/32* (2006.01)

(52) U.S. Cl.
CPC .......... *G06F 21/6209* (2013.01); *G06F 21/31* (2013.01); *G06F 21/602* (2013.01); *H04L 9/3226* (2013.01)

(58) Field of Classification Search
CPC ....... H04L 9/06; H04L 9/0618; H04L 9/0631; H04L 9/3226; G06F 21/6209; G06F 21/60; G06F 21/6218; G06F 21/31; G06F 21/602
USPC ............ 380/28–29; 713/165, 168, 189, 193; 726/26–29
See application file for complete search history.

(56) References Cited

U.S. PATENT DOCUMENTS

| | | | |
|---|---|---|---|
| 7,523,309 B1 | 4/2009 | Talbot | |
| 7,966,375 B2 | 6/2011 | Steele | |
| 8,171,523 B2 | 5/2012 | Weksler | |
| 8,386,786 B2 * | 2/2013 | Irvine | G06F 21/6236 709/225 |
| 8,788,803 B2 * | 7/2014 | Irvine | G06F 21/6218 713/150 |
| 9,111,106 B2 * | 8/2015 | Matsuda | H04L 9/0894 |
| 2012/0311339 A1 * | 12/2012 | Irvine | H04L 63/0407 713/176 |
| 2013/0287210 A1 * | 10/2013 | Matsuda | H04L 9/0894 380/44 |

* cited by examiner

*Primary Examiner* — Hosuk Song
(74) *Attorney, Agent, or Firm* — Michael A. Springs

(57) ABSTRACT

A document security tool includes a memory and a processor. The processor receives a first command from a first user to save a document and in response: encrypts a username, email address, and job code of the first user to produce an encrypted file, merges the encrypted file with the document, and saves the document. The processor also receives a second command to access the document and in response: determines a second user who issued the command, determines a username, email address, and job code of the second user, extracts the username, email address, and job code of the first user from the document, and grants the second user access to the document if one or more of the username, email address, and job code of the second user matches one or more of the username, email address, and job code of the first user.

18 Claims, 5 Drawing Sheets

DOCUMENT SECURITY TOOL

TECHNICAL FIELD

This disclosure relates generally to a system for securing documents.

BACKGROUND

Documents can be stored in central locations where multiple users can access the documents. For security reasons, access to documents can be controlled so that certain users cannot access certain documents.

SUMMARY OF THE DISCLOSURE

According to one embodiment, a document security tool includes a memory and a processor. The memory stores a username of a first user, an email address of the first user, and a job code of the first user. The processor receives a first command from the first user to save a document and in response to receiving the first command to save the document: encrypts the username of the first user, the email address of the first user, and the job code of the first user using AES 128-bit encryption to produce an encrypted file, merges the encrypted file with the document, and saves the document after it is merged with the encrypted file. The processor also receives a second command to access the document and in response to receiving the second command to access the document: determines a second user who issued the command, determines a username of the second user, an email address of the second user, and a job code of the second user, extracts the username of the first user, the email address of the first user, and the job code of the first user from the document, and grants the second user access to the document if one or more of the username of the second user, the email address of the second user, and the job code of the second user matches one or more of the username of the first user, the email address of the first user, and the job code of the first user.

According to another embodiment, a method includes storing a username of a first user, an email address of the first user, and a job code of the first user. The method also includes receiving a first command from the first user to save a document and in response to receiving the first command to save the document: encrypting the username of the first user, the email address of the first user, and the job code of the first user using AES 128-bit encryption to produce an encrypted file, merging the encrypted file with the document, and saving the document after it is merged with the encrypted file. The method further includes receiving a second command to access the document and in response to receiving the second command to access the document: determining a second user who issued the command, determining a username of the second user, an email address of the second user, and a job code of the second user, extracting the username of the first user, the email address of the first user, and the job code of the first user from the document, and granting the second user access to the document if one or more of the username of the second user, the email address of the second user, and the job code of the second user matches one or more of the username of the first user, the email address of the first user, and the job code of the first user.

According to another embodiment, one or more computer-readable non-transitory storage media embodies software that is operable when executed to store a username of a first user, an email address of the first user, and a job code of the first user. The software is further operable when executed to receive a first command from the first user to save a document and in response to receiving the first command to save the document: encrypt the username of the first user, the email address of the first user, and the job code of the first user using AES 128-bit encryption to produce an encrypted file, merge the encrypted file with the document, and save the document after it is merged with the encrypted file. The software is also operable when executed to receive a second command to access the document and in response to receiving the second command to access the document: determine a second user who issued the command, determine a username of the second user, an email address of the second user, and a job code of the second user, extract the username of the first user, the email address of the first user, and the job code of the first user from the document, and grant the second user access to the document if one or more of the username of the second user, the email address of the second user, and the job code of the second user matches one or more of the username of the first user, the email address of the first user, and the job code of the first user.

Certain embodiments may provide one or more technical advantages. For example, an embodiment allows for document access to be controlled at an individual document level. As another example, an embodiment allows for document access information to be encrypted and/or protected. As yet another example, an embodiment allows for document access information to be applied to email. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 5 of the drawings, like numerals being used for like and corresponding parts of the various drawings.

Documents can be stored in central locations where multiple users can access the documents. For example, documents can be stored in a shared database such as a network drive and/or a shared folder. Multiple users may access the documents simultaneously by accessing these shared databases. For security reasons, access to documents can be controlled so that certain users cannot access certain documents. For example, the shared database may require users to authenticate themselves before access is granted to the database. As another example, a shared folder may have an access list that controls which users are authorized to access documents stored within the folder. If a user has access to the database and/or the folder, then the user may access the documents stored in the database or the folder.

However, these forms of controlling document access present challenges that threaten the security of the documents. For example, these forms of access control may not allow for document access to be controlled at an individual document level. When documents are stored in shared databases and/or folders, access to the documents is controlled at a database and/or folder level. If a document in the database or in the folder should have different access control than other documents in the database or the folder, then that document needs to be moved to a different database or to a different folder. As another example, access control information may be viewed and/or edited by users who are not authorized to do so. In this manner, access to the database or to the folder may be manipulated so that unauthorized users may access the documents. As yet another example, when the documents are sent via email, access control on those documents may not be obeyed and/or respected by the receiving system. As a result, in some instances, document security is completely compromised when the document is emailed to other users.

Figure 1:
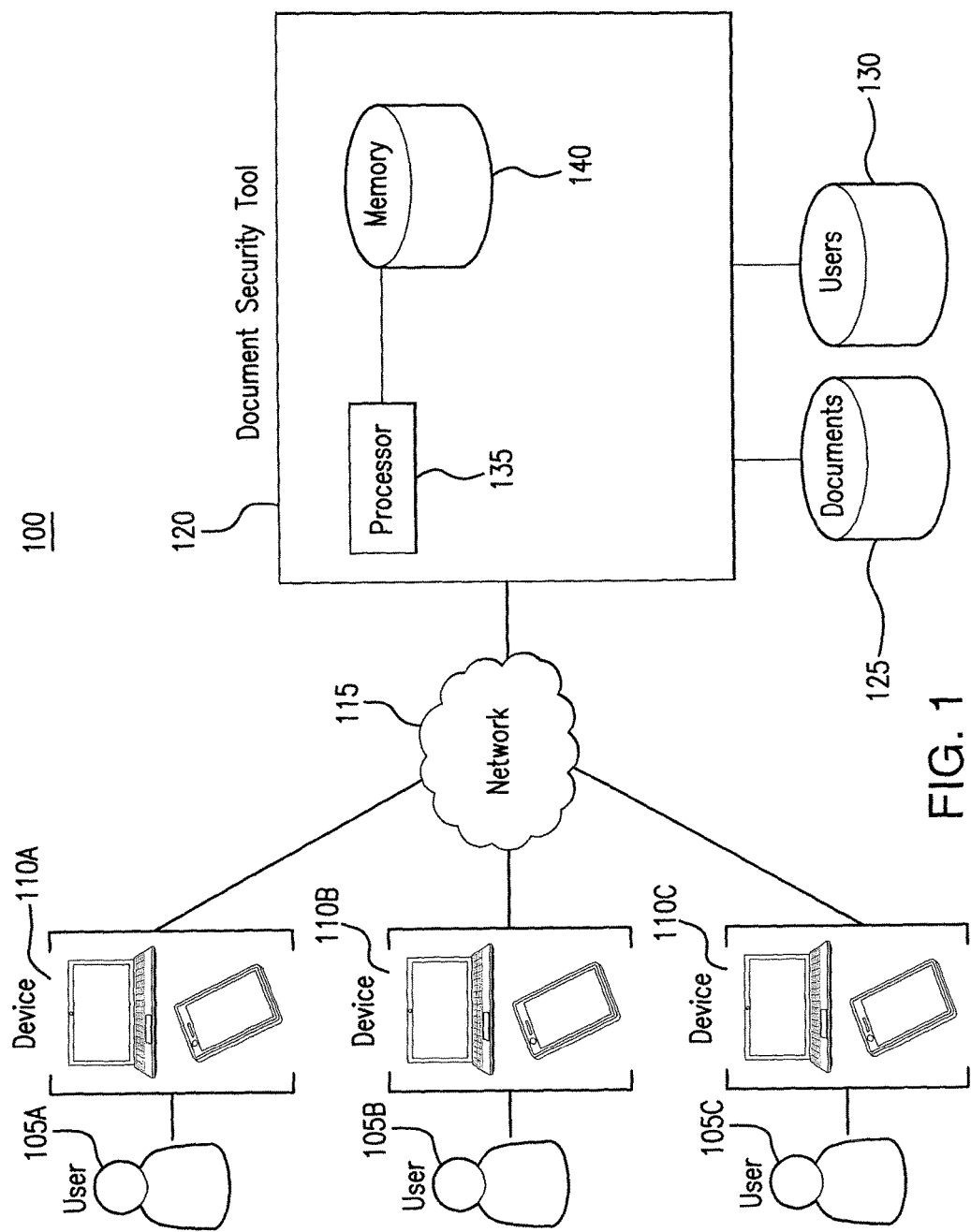
FIG. 1 illustrates a system for controlling document access.

This disclosure contemplates a system that addresses these and other challenges. The system encrypts document access information for a document and merges that encrypted information with the document. In this manner, access control information may be maintained at an individual document level. Furthermore, document access information may be encrypted and/or protected from unauthorized modification. The system also applies document access control through email so that document security is not broken by sending documents through email. The system will be described in more detail using FIGS. 1 through 5. FIG. 1 describes the system generally. FIGS. 2 through 5 describe the operation of the system in more detail.

FIG. 1 illustrates a system 100 for controlling document access. As illustrated in FIG. 1, system 100 includes one or more users 105a, 105b and 105c, one or more devices 110a, 110b and 11c, network 115, document security tool 120, documents database 125, and users database 130. This disclosure contemplates system 100 including any appropriate number of users, devices, networks and databases. In particular embodiments, system 100 allows for document access to be controlled at an individual document level. In some embodiments, system 100 allows for document access information to be encrypted and/or protected.

System 100 includes one or more users 105a, 105b and 105c. Each user 105 may be an individual and/or a group of individuals. Each user 105 may create and/or access documents using system 100. Each user 105 may also send emails using system 100. Access by each user 105 to documents over system 100 may be controlled and/or limited. For example, user 105a may access documents that user 105a created. However, user 105a may not have access to documents that user 105b created. Each user 105 may belong to a corporate entity and may have a role and/or title that indicates the user's 105 responsibilities at the corporate entity. In certain instances, a user 105 may have access to certain documents as a result of the user's 105 position within the corporate entity. For example, a high ranking director may have access to documents created by the director's reportings.

System 100 includes one or more devices 110a, 110b and 110c. Each user 105a, 105b and 105c may use devices 110a, 110b and 110c to create and/or access documents over system 100. This disclosure contemplates device(s) 105 being any appropriate device that can communicate over network 115. For example, device(s) 105 may be a computer, a laptop, a wireless or cellular telephone, an electronic notebook, a personal digital assistant, a tablet, a server, a mainframe, or any other device capable of receiving, processing, storing, and/or communicating information with other components of system 100. Device(s) 105 may also include a user interface, such as a display, a microphone, keypad, or other appropriate terminal equipment usable by a user. In some embodiments, an application executed by device(s) 105 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 110 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Document security tool 120 controls document access for system 100. As illustrated in FIG. 1, document security tool 120 includes a processor 135 and a memory 140. This disclosure contemplates processor 135 and memory 140 being configured to perform any of the functions of document security tool 120 described herein. Processor 135 may be communicatively coupled to memory 140.

Processor 135 is any electronic circuitry, including, but not limited to microprocessors, application specific integrated circuits (ASIC), application specific instruction set processor (ASIP), and/or state machines, that communicatively couples to memory 140 and controls the operation of document security tool 120. Processor 135 may be 8-bit, 16-bit, 32-bit, 64-bit or of any other suitable architecture. Processor 135 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 135 may include other hardware and software that operates to control and process information. Processor 135 executes software stored on memory to perform any of the functions described herein. Processor 135 controls the operation and administration of document security tool 120 by processing information received from network 115, device(s) 105, and memory 140. Processor 135 may be a programmable logic device, a microcontroller, a microprocessor, any suitable processing device, or any suitable combination of the preceding. Processor 135 is not limited to a single processing device and may encompass multiple processing devices.

Memory 140 may store, either permanently or temporarily, data, operational software, or other information for processor 135. Memory 140 may include any one or a combination of volatile or non-volatile local or remote devices suitable for storing information. For example, memory 140 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 140, a disk, a CD, or a flash drive. In particular embodiments, the software may include an application executable by processor 135 to perform one or more of the functions described herein.

In particular embodiments, document security tool 120 controls document access at an individual document level. For example, when user 105a creates a document, document security tool 120 embeds or merges within the created document information that identifies user 105a such as, for example, a username, an email address, or a job code that indicates user's 105a role at user's 105a job. This information may be encrypted using any appropriate encryption scheme such as AES 128-bit encryption before it is embedded and/or merged with the document. The document may then be saved in, for example, documents database 125 to be accessed at a later time.

When document access is requested, document security tool 120 may determine the user who requested access and then determine identifying information for that user. Document security tool 120 then extracts access control information from the document and compares it with the identifying information for the user. If, based on the comparison, document security tool 120 determines that the user is included in the documents access control information, document security tool 120 may grant access to the user. Otherwise, document security tool 120 denies access to the user.

In certain embodiments, document security tool 120 may grant access to users 105 who share only a job code with another user who does have authorization to access the document. For example, if a creator of a document leaves a company, the replacement for that user should have access to the document. However, that replacement will have a different username and a different email address than the previous user. In that instance, when document security tool 120 compares the replacement's identifying information with the user's identifying information, document security tool 120 may only find a match with the replacement's job code and the user's job code. In that instance, document security tool 120 may still grant access to the replacement based on the matching job codes. In this manner, document security tool 120 may grant access to users who are replacing other users who do have authorization to access a document.

Documents database 125 may store documents in system 100. Documents database 125 may be a shared network drive and/or a separate database. The documents in documents database 125 may each include access control information embedded or merged within the document. The access control information may identify the users who are authorized to access the document. This disclosure contemplates system 100 including any appropriate number of documents databases 125.

Users database 130 may hold identifying information for users 105 of system 100. For example, users database 130 may hold usernames, email addresses, and job codes of users 105 of system 100. Document security tool 120 may retrieve the identifying information from users database 130. This disclosure contemplates system 100 including any appropriate number of users databases 130. In particular embodiments, by using system 100, document access control may be performed at an individual document level. Furthermore, access control information may be encrypted and/or protected within each document. FIGS. 2 through 5 will describe the operation of system 100 in more detail.

Figure 2:
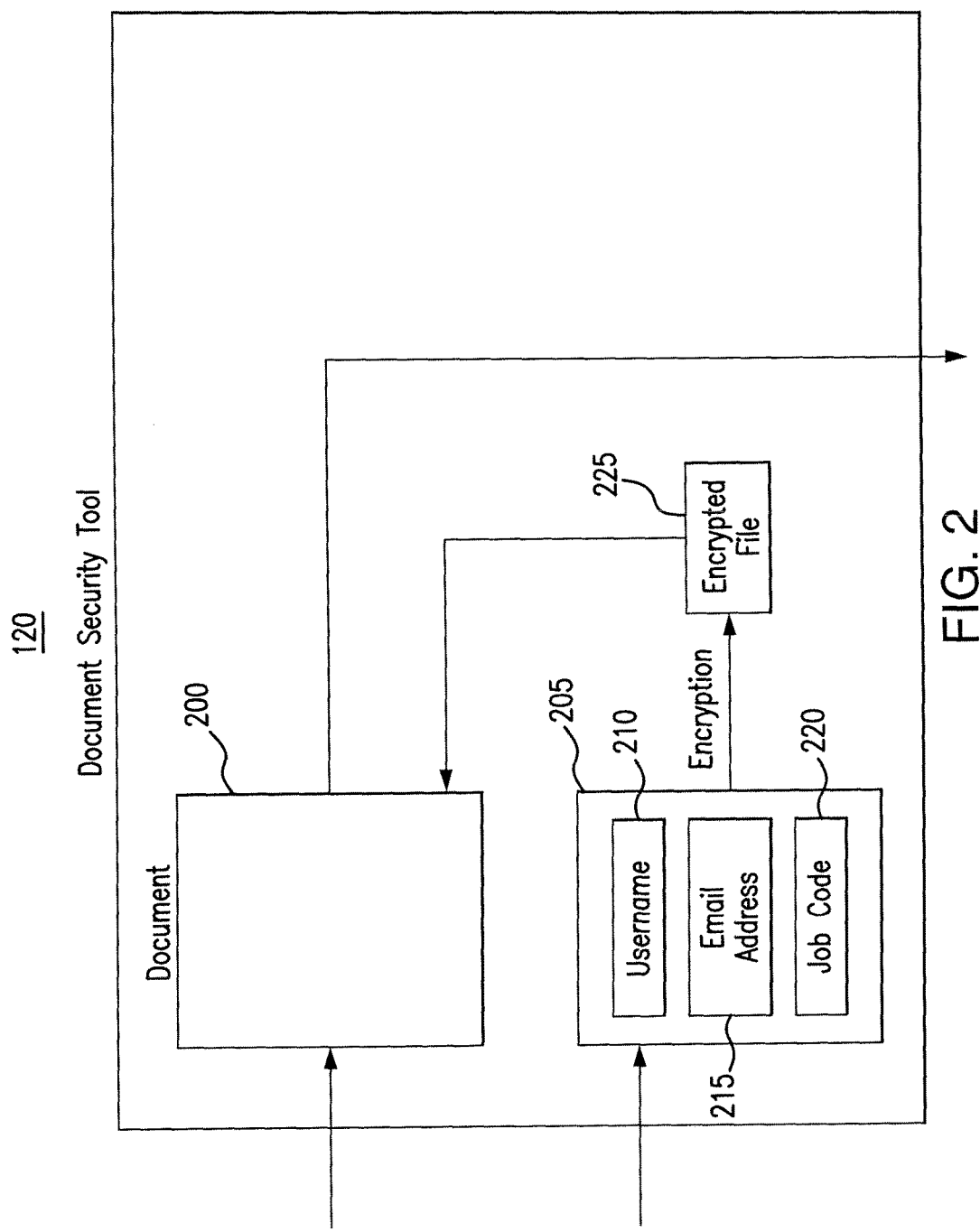
FIG. 2 illustrates the document security tool of the system of FIG. 1.

FIG. 2 illustrates the document security tool 120 of the system 100 of FIG. 1. As illustrated in FIG. 2, document security tool 120 may create and/or save a document 200 by merging user information 205 with document 200. The information 205 may be encrypted before being merged and/or embedded within document 200.

Document 200 may be any appropriate files such as, for example, a text document, an image, an email, and/or a presentation. Document security tool 120 may receive document 200 when a user 105 creates and/or attempts to save document 200. Document security tool 120 may save document 200 to one or more documents databases 125.

When a user attempts to create and/or save document 200, document security tool 120 may receive a command to create and/or save document 200. Document security tool 120 may then determine the user 105 that issued the command to create and/or save document 200. Document security tool 120 may then retrieve identifying information 205 for that user 105 from users database 130. Identifying information 205 may include any information that identifies user 105 such as, for example, a username 210, an email address 215, and/or a job code 220. This disclosure contemplates document security tool 120 retrieving any appropriate type of information that identifies user 105.

After receiving information 205, document security tool 120 encrypts information 205 using any appropriate encryption scheme to produce encrypted file 225. This disclosure contemplates document security tool 120 using any appropriate encryption scheme such as, for example, AES 128-bit encryption, AES 256-bit encryption, Triple DES encryption, RSA encryption, Rabin encryption, etc. After producing encrypted file 225 document security tool 120 merges and/or embeds encrypted file 225 within document 200. In this manner, when document 200 is retrieved from documents database 125, document security tool 120 may extract information 205 by extracting encrypted file 225 and decrypting encrypted file 225. Furthermore, information 205 may be kept with document 200.

Figure 3:
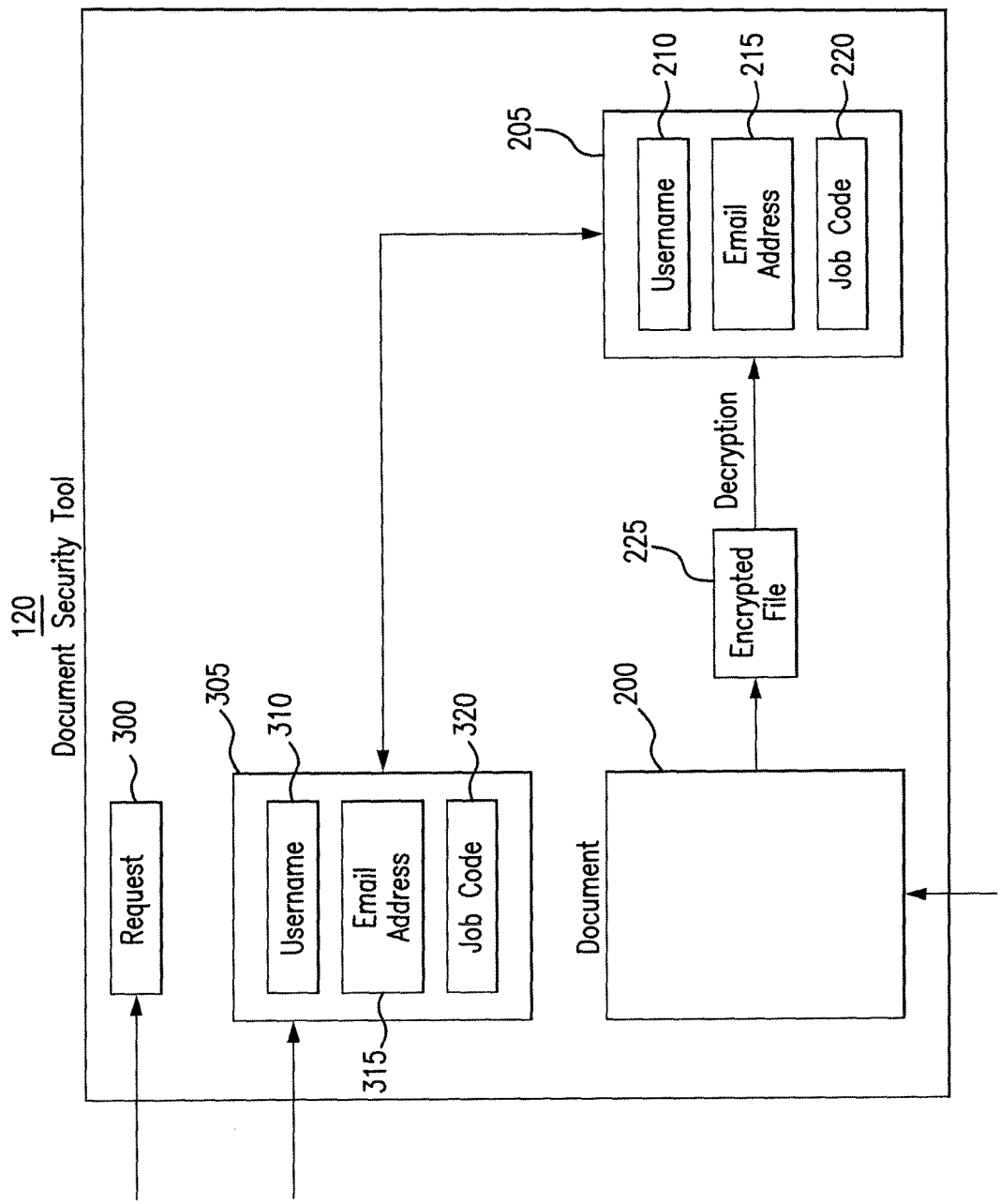
FIG. 3 illustrates the document security tool of the system of FIG. 1.

FIG. 3 illustrates the document security tool 120 of the system 100 of FIG. 1. As illustrated in FIG. 3, document security tool 120 may determine whether a user 105 has authorization to access document 200.

Document security tool 120 may receive a request and/or a command 300 to access document 200. Document security tool 120 may determine that a user 105 issued request 300. In response, document security tool 120 may retrieve identifying information 305 for that user 105 from users database 130. Identifying information 305 may include any appropriate type of information to identify the user 105 such as, for example, username 310, email address 315, and/or job code 320. Document security tool 120 may then retrieve document 200 from documents database 125. Document security tool 120 may then extract encrypted file 225 from document 200 and decrypt encrypted file 225 to produce information 205, which may include username 210, email address 215, and job code 220.

Document security tool 120 may then compare information 305 with information 205 to see if the requesting user 105 has authorization to access document 200. For example, if username 310 matches username 210, the document security tool 120 may grant access to user 105. As another example, if email address 315 matches email address 215, document security tool 120 may grant access to user 105. As yet another example, if job code 320 matches job code 220, document security code may grant access to user 105. This disclosure contemplates document security tool 120 granting access to user 105 if one or more of username 310, email address 315, and job code 320 matches one or more of username 210, email address 215, and job code 220. In certain embodiments, if username 310 does not match username 210, if email address 315 does not match email address 215, or if job code 320 does not match job code 220, the document security tool 120 may deny address to document 200. In particular embodiments, document security tool 120 may grant access even though username 310 does not match username 210 and email address 315 does not match email address 215 as long as job code 320 matches job code 220. This represents the situation where user 105 is replacing a previous user who may have left a company. In some embodiments, document security tool 120 grants access only if all of username 310, email address 315, and job code 320 matches username 210, email address 215, and job code 220. In certain embodiments, document security tool 120 denies access if one or more of username 310, email address 315, and job code 320 does not match username 210, email address 215, and job code 220.

In this manner, document security tool 120 may control access to document 200. Furthermore, the users who have access to document 200 may be identified with information contained within document 200. As a result, access to document 200 is controlled at the document level rather than at a folder and/or database level.

In particular embodiments, document security tool 120 may add users so that those users can access document 200. For example, request 300 may be from user 105a. Use 105a may request to add user 105b to the access list for document 200. In response to receiving request 300, document 120 may retrieve information 305 for user 105a. Document security tool 120 may then compare information 305 with information 205 to see if user 105a has access to document 200. If user 105a does have access to document 200, then document security tool 120 may follow the steps described using FIG. 2 to add user 105b to the access list for document 200. For example, document security tool 120 may retrieve information that identifies user 105b. Document security tool 120 may then encrypt that information and merge and/or embed that information within document 200.

Figure 4:
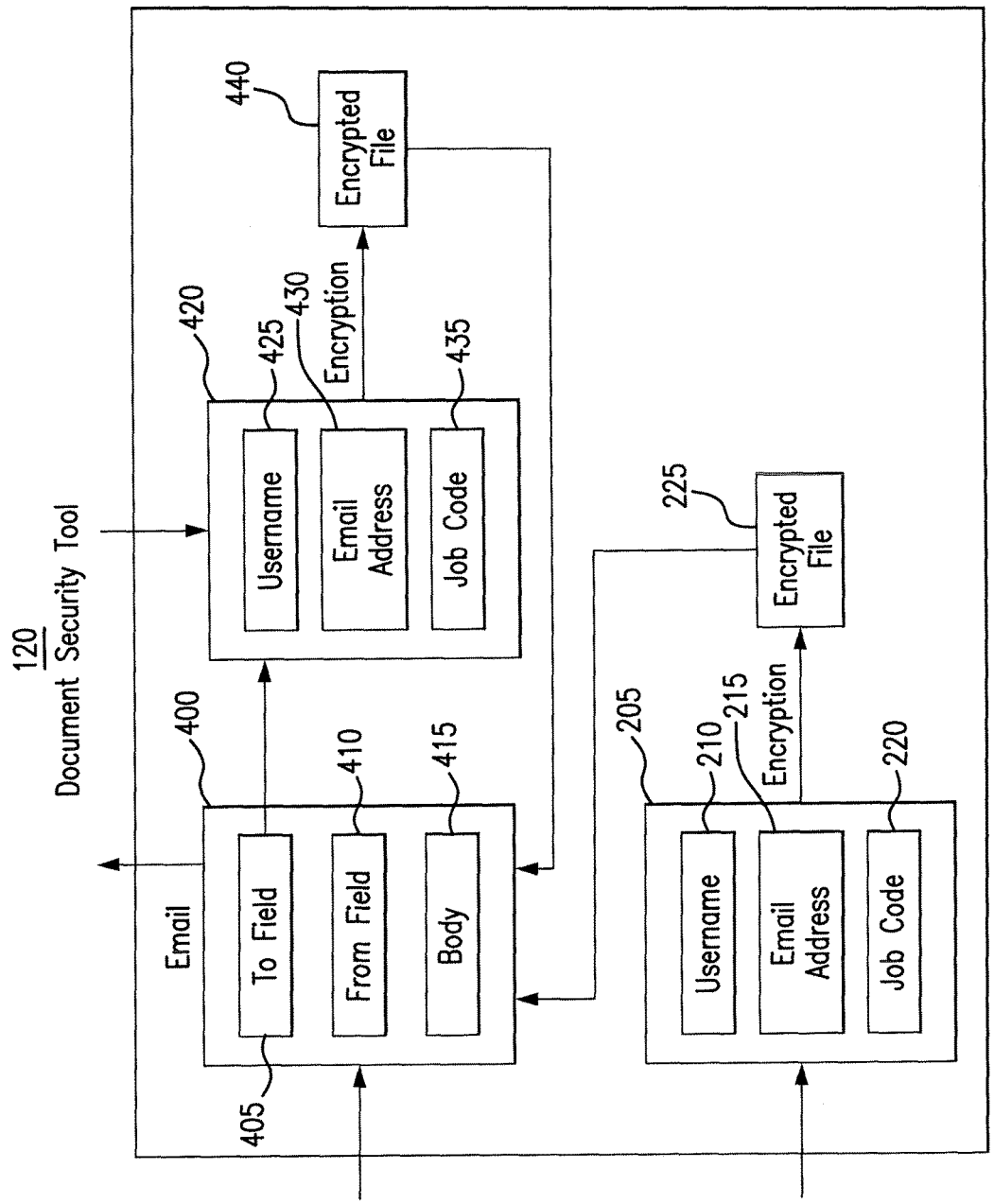
FIG. 4 illustrates the document security tool of the system of FIG. 1.

FIG. 4 illustrates the document security tool 120 of the system 100 of FIG. 1 controlling access to an email 400. Although this disclosure contemplates document 200 being an email 400, document security tool 120 may perform certain additional steps for email 400.

Document security tool 120 may receive email 400 when a user 105 sends email 400. Email 400 may include various fields such as, for example, a to field 405, a from field 410, and a body 415. To field 405 may indicate the intended recipients of email 400, from field 410 may identify the sender of email 400, and body 415 may include text intended to be read by the intended recipients of email 400.

When document security tool receives email 400, document security tool 120 may retrieve identifying information 205 for the sender of email 400. Similar to documents 200 creation, document security tool 120 may encrypt information 205 and merge encrypted file 225 with email 400. Additionally, document security tool 120 may retrieve identifying information 420 that identifies the intended recipients of email 400. For example, document security tool 120 may analyze to field 405 to identify the intended recipients of email 400. Then, document security tool 120 may retrieve identifying information 420 for the intended recipients. Identifying information 420 may include any appropriate information that identifies the intended recipients such as, for example, username 425, email address 430, and job code 435 of the intended recipient. Document security tool 120 may then encrypt identifying information 420 to produce encrypted file 440. Document security tool 120 may then merge and/or embed encrypted file 440 and email 400. In this manner, email 400 may be accessible by the sender of email 400 and by the intended recipients of email 400.

In particular embodiments, document security tool 120 may determine that email 400 was received because the sender of email 400 is forwarding an already existing email. In this instance, document security tool 120 may retrieve the access list from the already existing email to determine whether the sender of forwarded email 400 has access to the original email. For example, document security tool 120 may compare the identifying information such as, for example, username, email address, or job code of the sender with extracted username, email address, and job code from the previously existing email. If the sender of the forwarded email has access to the original email, then document security tool 120 may forward email 400 to the intended recipients. Furthermore, document security tool 120 may encrypt and merge the identifying information of the intended recipients of the forwarded email to the access list of the previously existing email. In this manner, the intended recipients of the forwarded email will be given access to the previously existing email.

In particular embodiments, email 400 may include an attachment. For example, email 400 may include an attachment of document 200. Document security tool 120 may perform additional steps when document 200 is attached to email 400 to ensure that access control on document 200 is not bypassed by attaching it to email 400. For example, document security tool 120 may extract identifying information for users who have access to document 200 from document 200 when document security tool 120 determines that email 400 includes document 200. Then, document security tool 120 may compare the extracted identifying information with the identifying information of a sender of email 400. If the sender of email 400 has access to document 200, then document security tool 120 may determine that the sender of email 400 may send document 200 through email 400. Additionally, document security tool 120 may determine the intended recipients of email 400, retrieve the identifying information of the intended recipients, encrypt that identifying information, and embed and/or merge that encrypted information with email 400 and/or document 200. In this manner, the intended recipients of email 400 may be granted access to email 400 and document 200.

In particular embodiments, by handling email in this manner document security tool 120 may ensure that access control for a document is not bypassed by simply emailing the document to other users. Furthermore, document security tool 120 may allow users to grant access to the document to other users through email.

Figure 5:
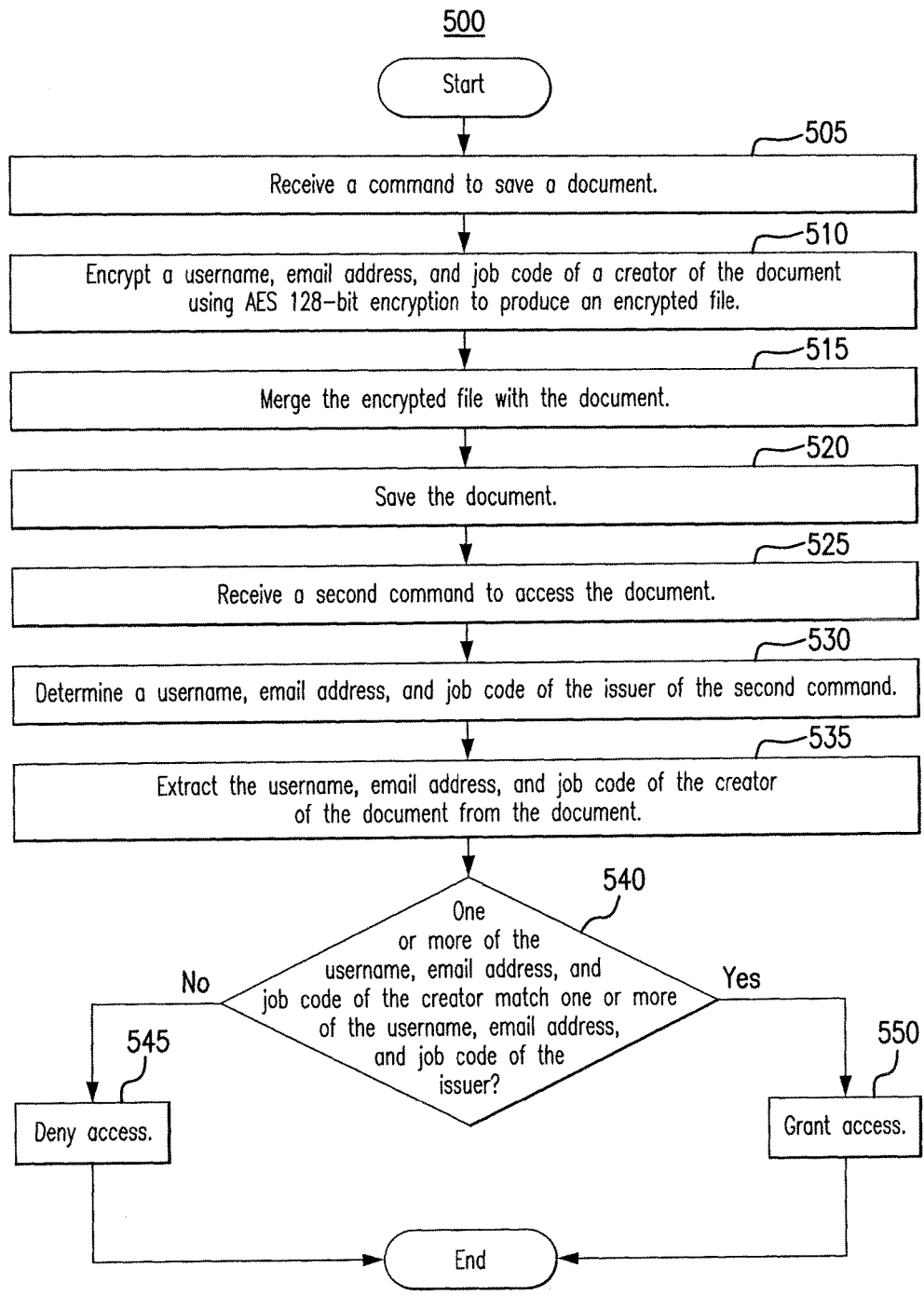
FIG. 5 is a flowchart illustrating a method for controlling document access using the system of FIG. 1.

FIG. 5 is a flowchart illustrating a method 500 for controlling document access using the system 100 of FIG. 1. In particular embodiments, document security tool 120 performs method 500. By performing method 500, document security tool 120 may allow access control to be performed at the document level. Furthermore, document security tool 120 may allow for access control information to be encrypted and/or protected within each document. Furthermore, document security tool 120 may allow for document control to occur over email.

Document security tool 120 may begin by receiving a command to save a document in step 505. In response to receiving the command, document security tool 120 may encrypt a username, email address and job code of a creator of a document using AES-128 bit encryption to produce an encrypted file in step 510. Then, document security tool 120 may merge the encrypted file with the document in step 515. After that, document security tool 120 may save the document in step 520.

In step 525, document security tool 120 may receive a second command to access the document. In response, document security tool 120 may determine a username, email address, and job code of the issuer of the second command in step 530. Then in step 535, document security tool 120 may extract the username, email address, and job code of the creator of the document from the document. In step 540, document security tool 120 may determine if one or more of the username, email address, and job code of the creator match one or more of the username, email address, and job code of the issuer. If one or more of the username, email address, and job code of the creator does not match one or more of the username, email address, and job code of the issuer, document security tool 120 may deny access in step 545. If one or more of the username, email address, and job code of the creator does match one or more of the username, email address, and job code of the issuer document security, tool 120 may grant access in step 550.

Modifications, additions, or omissions may be made to method 300 depicted in FIG. 5. Method 500 may include more, fewer, or other steps. For example, steps may be performed in parallel or in any suitable order. While discussed as document security tool 120 performing the steps, any suitable component of system 100, such as device(s) 105 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A document security tool comprising:
    a memory configured to store a username of a first user, an email address of the first user, and a job code of the first user, the job code indicating the first user's role at the first user's job; and
    a processor communicatively coupled to the memory, the processor configured to:
        receive a first command from the first user to save a document;
        in response to receiving the first command to save the document:
            encrypt the username of the first user, the email address of the first user, and the job code of the first user using AES 128-bit encryption to produce an encrypted file;
            merge the encrypted file with the document; and
            save the document after it is merged with the encrypted file;
        receive a second command to access the document;
        in response to receiving the second command to access the document:
            determine a second user who issued the command;
            determine a username of the second user, an email address of the second user, and a job code of the second user;
            extract the username of the first user, the email address of the first user, and the job code of the first user from the document; and
            grant the second user access to the document if one or more of the username of the second user, the email address of the second user, and the job code of the second user matches one or more of the username of the first user, the email address of the first user, and the job code of the first user;
        detect that the first user has issued a third command to send an email to a third user;
        in response to detecting that the first user has issued the third command, encrypt a username of the third user, an email address of the third user, and a job code of the third user using AES 128-bit encryption to produce a second encrypted file;
        merge the second encrypted file with the email;
        determine that a fourth command to view the email has been issued; and
        in response to the determination that the fourth command has been issued:
            determine that a fourth user issued the fourth command;
            determine a username of the fourth user, an email address of the fourth user, and a job code of the fourth user;
            extract the username of the third user, the email address of the third user, and the job code of the third user from the second encrypted file; and
            grant access to the email to the fourth user if one or more of the username of the fourth user, the email address of the fourth user, and the job code of the fourth user matches one or more of the username of the third user, the email address of the third user, and the job code of the third user.

2. The document security tool of claim 1, wherein the processor is further configured to grant the second user access to the document if the job code of the second user matches the job code of the first user, the username of the second user does not match the username of the first user, and the email address of the second user does not match the email address of the first user.

3. The document security tool of claim 1, wherein the processor is further configured to grant the second user access to the document only if the job code of the second user matches the job code of the first user, the username of the second user matches the username of the first user, and the email address of the second user matches the email address of the first user.

4. The document security tool of claim 1, wherein the processor is further configured to:
    determine that a fifth command to forward the email to a fifth user has been issued;
    in response to determining that the fifth command has been issued:
        determine that the fifth command was issued by a sixth user;
        extract the username of the third user, the email address of the third user, and the job code of the third user from the email; and
        if one or more of a username of the sixth user matches the username of the third user, an email address of sixth user matches the email address of the third user, and a job code of the sixth user matches the job code of the third user:
            encrypt the username of the sixth user, the email address of the sixth user, and the job code of the sixth user using AES 128-bit encryption to produce a third encrypted file; and
            merge the third encrypted file with the email.

5. The document security tool of claim 1, wherein the processor is further configured to:
- detect that the first user has issued a third command to send an email to a third user;
- determine that the email includes an attachment comprising the document;
- extract a username of a fourth user, an email address of the fourth user, and a job code of the fourth user from the document;
- determine whether one or more of the username of the first user, the email address of the first user, and the job code of the first user matches one or more of the username of the fourth user, the email address of the fourth user, and the job code of the fourth user; and
- if one or more of the username of the first user, the email address of the first user, and the job code of the first user matches one or more of the username of the fourth user, the email address of the fourth user, and the job code of the fourth user:
  - encrypt a username of the third user, an email address of the third user, and a job code of the third user using AES 128-bit encryption to produce a second encrypted file;
  - merge the second encrypted file with the document; and
  - send the email to the third user.

6. The document security tool of claim 1, wherein the processor is further configured to deny the second user access to the document if one or more of the username of the second user does not match the username of the first user, the email address of the second user does not match the email address of the first user, and the job code of the second user does not match the job code of the first user.

7. A method comprising:
- storing a username of a first user, an email address of the first user, and a job code of the first user, the job code indicating the first user's role at the first user's job;
- receiving a first command from the first user to save a document;
- in response to receiving the first command to save the document:
  - encrypting the username of the first user, the email address of the first user, and the job code of the first user using AES 128-bit encryption to produce an encrypted file;
  - merging the encrypted file with the document; and
  - saving the document after it is merged with the encrypted file;
- receiving a second command to access the document;
- in response to receiving the second command to access the document:
  - determining a second user who issued the command;
  - determining a username of the second user, an email address of the second user, and a job code of the second user;
  - extracting the username of the first user, the email address of the first user, and the job code of the first user from the document; and
  - granting the second user access to the document if one or more of the username of the second user, the email address of the second user, and the job code of the second user matches one or more of the username of the first user, the email address of the first user, and the job code of the first user;
- detecting that the first user has issued a third command to send an email to a third user;
- in response to detecting that the first user has issued the third command, encrypting a username of the third user, an email address of the third user, and a job code of the third user using AES 128-bit encryption to produce a second encrypted file;
- merging the second encrypted file with the email;
- determining that a fourth command to view the email has been issued; and
- in response to the determination that the fourth command has been issued:
  - determining that a fourth user issued the fourth command;
  - determining a username of the fourth user, an email address of the fourth user, and a job code of the fourth user;
  - extracting the username of the third user, the email address of the third user, and the job code of the third user from the second encrypted file; and
  - granting access to the email to the fourth user if one or more of the username of the fourth user, the email address of the fourth user, and the job code of the fourth user matches one or more of the username of the third user, the email address of the third user, and the job code of the third user.

8. The method of claim 7, further comprising granting the second user access to the document if the job code of the second user matches the job code of the first user, the username of the second user does not match the username of the first user, and the email address of the second user does not match the email address of the first user.

9. The method of claim 7, further comprising granting the second user access to the document only if the job code of the second user matches the job code of the first user, the username of the second user matches the username of the first user, and the email address of the second user matches the email address of the first user.

10. The method of claim 7, further comprising:
- determining that a fifth command to forward the email to a fifth user has been issued;
- in response to determining that the fifth command has been issued:
  - determining that the fifth command was issued by a sixth user;
  - extracting the username of the third user, the email address of the third user, and the job code of the third user from the email; and
  - if one or more of a username of the sixth user matches the username of the third user, an email address of sixth user matches the email address of the third user, and a job code of the sixth user matches the job code of the third user:
    - encrypting the username of the sixth user, the email address of the sixth user, and the job code of the sixth user using AES 128-bit encryption to produce a third encrypted file; and
    - merging the third encrypted file with the email.

11. The method of claim 7, further comprising:
- detecting that the first user has issued a third command to send an email to a third user;
- determining that the email includes an attachment comprising the document;
- extracting a username of a fourth user, an email address of the fourth user, and a job code of the fourth user from the document;
- determining whether one or more of the username of the first user, the email address of the first user, and the job code of the first user matches one or more of the username of the fourth user, the email address of the fourth user, and the job code of the fourth user; and if one or more of the username of the first user, the email address of the first user, and the job code of the first user matches one or more of the username of the fourth user, the email address of the fourth user, and the job code of the fourth user:
  encrypting a username of the third user, an email address of the third user, and a job code of the third user using AES 128-bit encryption to produce a second encrypted file;
  merging the second encrypted file with the document; and
  sending the email to the third user.

12. The method of claim 7, further comprising denying the second user access to the document if one or more of the username of the second user does not match the username of the first user, the email address of the second user does not match the email address of the first user, and the job code of the second user does not match the job code of the first user.

13. One or more computer-readable non-transitory storage media embodying software that is operable when executed to:
  store a username of a first user, an email address of the first user, and a job code of the first user, the job code indicating the first user's role at the first user's job; and
  receive a first command from the first user to save a document;
  in response to receiving the first command to save the document:
    encrypt the username of the first user, the email address of the first user, and the job code of the first user using AES 128-bit encryption to produce an encrypted file;
    merge the encrypted file with the document; and
    save the document after it is merged with the encrypted file;
  receive a second command to access the document;
  in response to receiving the second command to access the document:
    determine a second user who issued the command;
    determine a username of the second user, an email address of the second user, and a job code of the second user;
    extract the username of the first user, the email address of the first user, and the job code of the first user from the document; and
    grant the second user access to the document if one or more of the username of the second user, the email address of the second user, and the job code of the second user matches one or more of the username of the first user, the email address of the first user, and the job code of the first user;
  detect that the first user has issued a third command to send an email to a third user;
  in response to detecting that the first user has issued the third command, encrypt a username of the third user, an email address of the third user, and a job code of the third user using AES 128-bit encryption to produce a second encrypted file;
  merge the second encrypted file with the email;
  determine that a fourth command to view the email has been issued; and
  in response to the determination that the fourth command has been issued:
    determine that a fourth user issued the fourth command;
    determine a username of the fourth user, an email address of the fourth user, and a job code of the fourth user;
    extract the username of the third user, the email address of the third user, and the job code of the third user from the second encrypted file; and
    grant access to the email to the fourth user if one or more of the username of the fourth user, the email address of the fourth user, and the job code of the fourth user matches one or more of the username of the third user, the email address of the third user, and the job code of the third user.

14. The media of claim 13 embodying software that is further operable when executed to grant the second user access to the document if the job code of the second user matches the job code of the first user, the username of the second user does not match the username of the first user, and the email address of the second user does not match the email address of the first user.

15. The media of claim 13 embodying software that is further operable when executed to grant the second user access to the document only if the job code of the second user matches the job code of the first user, the username of the second user matches the username of the first user, and the email address of the second user matches the email address of the first user.

16. The media of claim 13 embodying software that is further operable when executed to:
  determine that a fifth command to forward the email to a fifth user has been issued;
  in response to determining that the fifth command has been issued:
    determine that the fifth command was issued by a sixth user;
    extract the username of the third user, the email address of the third user, and the job code of the third user from the email; and
    if one or more of a username of the sixth user matches the username of the third user, an email address of sixth user matches the email address of the third user, and a job code of the sixth user matches the job code of the third user:
      encrypt the username of the sixth user, the email address of the sixth user, and the job code of the sixth user using AES 128-bit encryption to produce a third encrypted file; and
      merge the third encrypted file with the email.

17. The media of claim 13 embodying software that is further operable when executed to:
  detect that the first user has issued a third command to send an email to a third user;
  determine that the email includes an attachment comprising the document;
  extract a username of a fourth user, an email address of the fourth user, and a job code of the fourth user from the document;
  determine whether one or more of the username of the first user, the email address of the first user, and the job code of the first user matches one or more of the username of the fourth user, the email address of the fourth user, and the job code of the fourth user; and
  if one or more of the username of the first user, the email address of the first user, and the job code of the first user matches one or more of the username of the fourth user, the email address of the fourth user, and the job code of the fourth user:

encrypt a username of the third user, an email address of the third user, and a job code of the third user using AES 128-bit encryption to produce a second encrypted file;

merge the second encrypted file with the document; and send the email to the third user.

18. The media of claim 13 embodying software that is further operable when executed to deny the second user access to the document if one or more of the username of the second user does not match the username of the first user, the email address of the second user does not match the email address of the first user, and the job code of the second user does not match the job code of the first user.

\* \* \* \* \*